No. 724,834. PATENTED APR. 7, 1903.
E. J. FARR.
BALL BEARING.
APPLICATION FILED JULY 11, 1901.
NO MODEL.
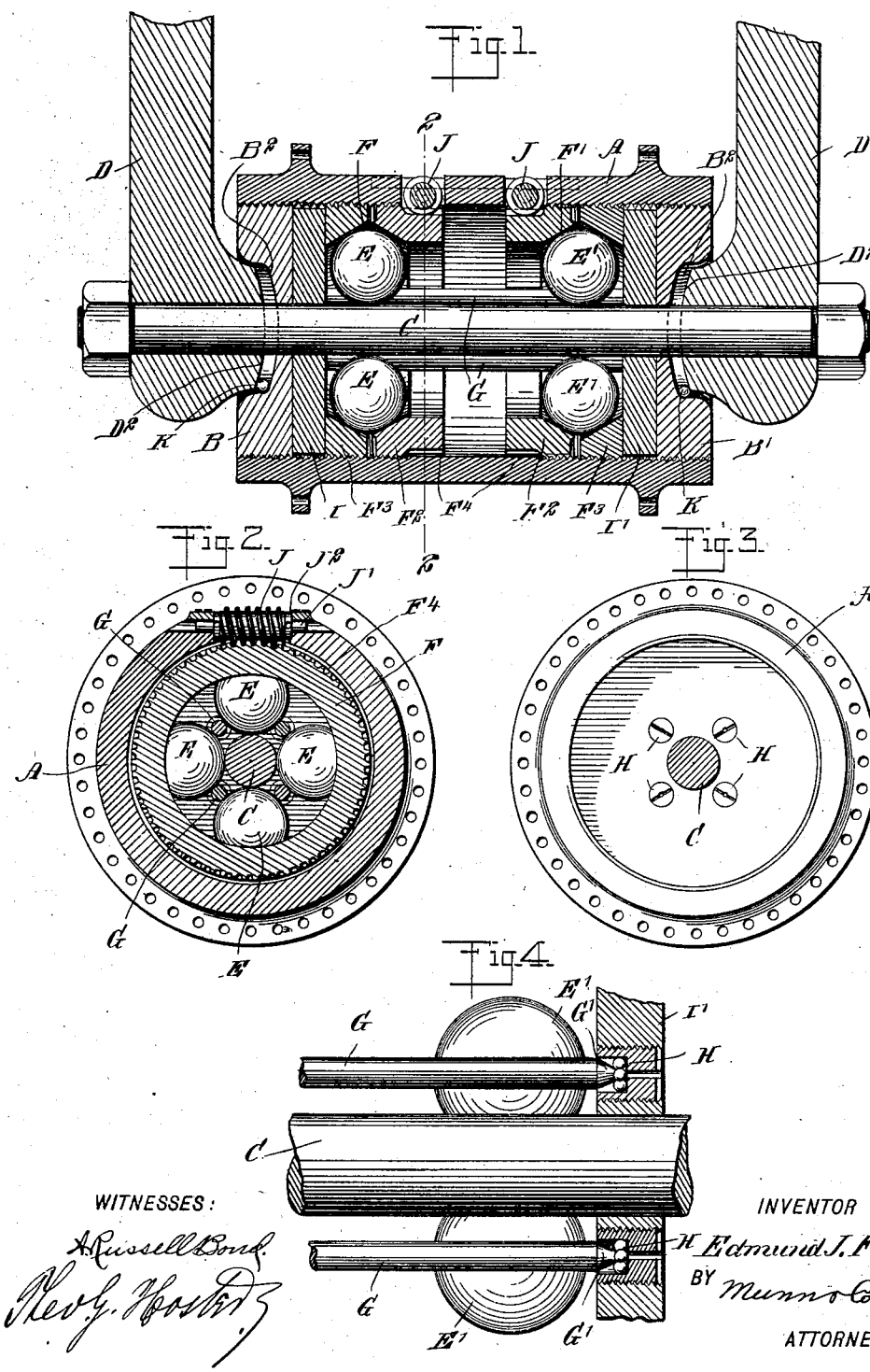
WITNESSES:
INVENTOR
Edmund J. Farr
BY Munn & Co
ATTORNEYS

UNITED STATES PATENT OFFICE.

EDMUND JANES FARR, OF BOSTON, MASSACHUSETTS.

BALL-BEARING.

SPECIFICATION forming part of Letters Patent No. 724,834, dated April 7, 1903.

Application filed July 11, 1901. Serial No. 67,870. (No model.)

*To all whom it may concern:*

Be it known that I, EDMUND JANES FARR, a citizen of the United States, and a resident of Boston, (West Roxbury,) in the county of Suffolk and State of Massachusetts, have invented a new and Improved Ball-Bearing, of which the following is a full, clear, and exact description.

The object of the invention is to provide a new and improved ball-bearing which is simple and durable in construction and arranged to prevent the balls from rubbing one against the other, to reduce friction to a minimum, and to allow of convenient and quick adjustment of the parts to compensate for wear.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1 is a longitudinal sectional elevation of the improvement as applied to the hub of a bicycle-wheel. Fig. 2 is a cross-section of the same on the line 2 2 in Fig. 1. Fig. 3 is an end view of the hub with the end plate removed; and Fig. 4 is an enlarged sectional elevation of the improvement, showing more particularly the mounting of the connecting-rods.

The improved ball-bearing illustrated in the drawings is applied to the hub A of a bicycle-wheel, and in the ends of said hub screw end plates B B', through which extends an axle C, engaged by the fork members D D' of the bicycle-frame. Within the hub A are arranged two sets of ball-bearings spaced apart and consisting of balls E E', traveling on the axle C and engaging with V-shaped raceways F F'. The members forming the raceways are each preferably made in two sections $F^2$ $F^3$, screwing in the hub A, as is plainly illustrated in the drawings. Adjacent balls of each ball-bearing are separated from each other by longitudinally-extending rods G, having their ends G' cone-shaped and mounted in ball-bearings H, carried in plates I I', abutting the end plates B B' and the sections $F^3$ of the members forming the raceways F F'. The inner faces of the sections $F^2$ $F^3$ are beveled to form when in position the V-shaped raceways, and the outer faces of the sections $F^2$ are formed with worm-wheels $F^4$, engaged by worms J, having their shafts J' journaled in suitable bearings in the hub A, as is plainly indicated in Figs. 1 and 2, said worms J extending in slots cut in the said hub A, and each worm is formed with apertures $J^2$ for the insertion of a pin or other tool to allow the operator to turn the worm-wheel, and thereby rotate the corresponding section $F^2$ to screw the same outward and compensate for wear. The section $F^3$ can be screwed inward for the same purpose upon the operator removing the plates B B' and I I'.

It is understood that by the construction described the sets of balls E E' have single-point contacts with the axle C and, as shown, a two-point contact with the sections forming the corresponding raceway F F', so that the friction is reduced to a minimum. By having the plates B B' screwing in the ends of the hub it is evident that dust is not liable to pass to the ball-bearings, and by permitting adjustment of the sections $F^2$ $F^3$ it is evident that the parts can be readily adjusted to compensate for wear.

The outer faces of the end plates B B' are formed with recesses having concave bottoms $B^2$, and the inner faces $D^2$ of the fork members D D' are correspondingly convexed and spaced from the bottoms $B^2$ to allow the insertion of a ball K in the space between the said surfaces $B^2$ and $D^2$, so that when the hub A revolves the ball K is free to travel in said space, and consequently takes up end thrust of the hub.

It is understood that the balls E E' and the rods G are so arranged relatively to each other that adjacent balls in each set are not only separated one from the other, but they are in contact with opposite sides of the rods, so that when a ball-bearing is in use the balls travel in the raceways, rotate around their own axis, and impart a rotary motion to the rods G, so that the friction between the contacting parts is reduced to a minimum. By having the plates I I' interposed between the sections $F^3$ and the end plates B B' it is evident that the ball-bearing is rendered completely dust-proof.

Having thus fully described my invention, I claim as new and desire to secure by Letters Patent—

1. A ball-bearing, comprising a hub, end plates for said hub, an axle extending through said end plates, members forming spaced raceways concentric with the axle, sets of spaced balls in said raceways and in contact with the axle, revoluble separating-rods extending parallel with the axle and passing between adjacent balls in each set of balls, and plates held between the end plates of the hub and the members forming the raceways and in which the said rods are journaled, as set forth.

2. A ball-bearing comprising a hub, end plates secured to the hub, an axle extending through the end plates, spaced members forming raceways and each having an inner and an outer section concentric with the axle, sets of spaced balls in said raceways and in contact with the axle, revoluble separating-rods extending parallel with the axle and passing between balls in each set of balls, plates in which the ends of the rods are journaled, the said plates being held between the end plates of the hub and the outer sections of the members forming the raceways, and means for adjusting the sections forming the raceways, as set forth.

3. A ball-bearing comprising a hub, end plates screwing in said hub, an axle extending through the end plates, members forming V-shaped raceways concentric with the axle and spaced apart at the center of the hub, said members being made in two sections screwing in the hub and adjustable one relatively to the other, the outer face of each inner section being formed with a worm-wheel, sets of spaced balls in said raceways and in contact with the axle, revoluble separating-rods extending parallel with the axle and passing between adjacent balls in each set of balls, removable plates engaging the inner faces of the end plates of the hubs and the outer sections of the members forming the raceways, ball-bearings carried by said plates for the ends of the separating-rods, and worms engaging the said worm-wheels and journaled in bearings in the hub, the said worms extending in slots in the hub, and formed with apertures, as set forth.

4. A ball-bearing comprising a hub, end plates for said hub, an axle extending through said end plates, members made in sections and located within said hub concentric with the axle, the said members forming spaced raceways, sets of spaced balls in said raceways, and in contact with the axle, revoluble separating-rods extending parallel with the axle and passing between adjacent balls in each set of balls, the said separating-rods being provided with conical ends, plates engaging the inner faces of the end plates and the outer sections of the members forming the raceways, and ball-bearings carried in said plates for engagement by the conical ends of said separating-rods, as set forth.

5. A hub having end plates, an axle extending through the same, fork members engaging the axle, the adjacent faces of the fork members and the plates being spaced apart to form a uniformly-curved ball-track, the face of one of said spaced parts being concaved and that of the other convexed and a ball in each track, as set forth.

6. A hub having end plates formed with recesses in their outer faces, the said recesses having concave bottoms, an axle extending through the end plates at the recesses, fork members engaging the axle and extending into the recesses, the inner faces of the fork members being convexed and uniformly spaced from the concave bottoms of the recesses forming curved ball-tracks, and a ball in each track, as set forth.

In testimony whereof I have signed my name to this specification in the presence of two subscribing witnesses.

EDMUND JANES FARR.

Witnesses:
WILLIAM HURLEY,
FRANK D. GLEASON.